United States Patent [19]

Southwick et al.

[11] Patent Number: 5,403,658
[45] Date of Patent: Apr. 4, 1995

[54] ADHESIVES CONTAINING VINYL AROMATIC HYDROCARBON/DIENE/ACRYLIC MONOMER BLOCK COPOLYMERS

[75] Inventors: Jeffrey G. Southwick; David R. Hansen, both of Houston, Tex.

[73] Assignee: Shell Oil Company, Houston, Tex.

[21] Appl. No.: 228,239

[22] Filed: Apr. 15, 1994

[51] Int. Cl.$^6$ ............................................. C09J 153/02
[52] U.S. Cl. ..................................... 428/355; 525/89; 525/94; 525/299
[58] Field of Search ........................... 525/89, 94, 299; 428/355

[56] References Cited

U.S. PATENT DOCUMENTS

| | | |
|---|---|---|
| H1251 | 11/1993 | Southwick . |
| 4,284,541 | 8/1981 | Takeda et al. . |
| 4,699,938 | 10/1987 | Minamizaki ............................ 525/89 |
| 4,994,508 | 2/1991 | Shiraki et al. . |
| 5,002,676 | 3/1991 | Willis et al. . |
| 5,278,245 | 1/1994 | DuBois ................................... 525/299 |
| 5,292,795 | 3/1994 | Southwick et al. . |
| 5,292,806 | 3/1994 | Diehl ...................................... 525/89 |

FOREIGN PATENT DOCUMENTS 0298667 7/1988 European Pat. Off. .

*Primary Examiner*—David Buttner
*Attorney, Agent, or Firm*—Donald F. Haas

[57] ABSTRACT

An adhesive composition comprising a) a tackifying resin, b) a styrene-isoprene-styrene block copolymer or a styrene-isoprene block copolymer with styrene blocks as the end blocks and having at least one internal block of an acrylic monomer, and c) a block copolymer of at least one vinyl aromatic hydrocarbon, at least one conjugated diolefin and at least one acrylic monomer, such as an alkyl methacrylate, which is on the end of the copolymer and is attached to a conjugated diolefin block.

18 Claims, No Drawings

ADHESIVES CONTAINING VINYL AROMATIC HYDROCARBON/DIENE/ACRYLIC MONOMER BLOCK COPOLYMERS

BACKGROUND OF THE INVENTION

This invention relates to an adhesive composition used in hot melt adhesives and solvent-based adhesives. More particularly, it relates to vinyl aromatic hydrocarbon/acrylic monomer block copolymer adhesive compositions.

It is known that a block copolymer can be obtained by an anionic copolymerization of conjugated dienes or such dienes and an alkenyl arene compound by using an organic alkali metal initiator. For example, block copolymers have been produced which comprise primarily those having a general structure A-B and A-B-A wherein the polymer blocks A comprise thermoplastic polymer blocks of alkenyl arenes such as polystyrene, while block B is a polymer block of a conjugated diene such as polybutadiene or polyisoprene. They may be linear, radial, star, tapered and/or asymmetric and hydrogenated or unhydrogenated. The proportion of the thermoplastic blocks to the elastomeric polymer block and the relative molecular weights of each of these blocks is balanced to obtain a rubber having unique performance characteristics.

It is well known that these polymers are useful in formulating adhesives. Such polymers are especially useful in formulating adhesives that are superior in adhesion to nonpolar surfaces. Styrene-isoprene-styrene block copolymers are known to be especially useful as such. They are commonly used in combination with an S-I block copolymer to increase tack. Acrylic adhesives are known to be useful for making adhesives that are superior in adhesion to polar surfaces such as steel, presumably because of favorable energetics between the polar acrylic functionality and the surface polarity. Statutory Invention Registration H1251 entitled "Acrylic-Containing Diene Copolymers in Adhesives, Sealants and Coatings" provides a hot melt adhesive composition which is based on a rubbery or elastomeric acrylic monomer-containing polymer which has superior adhesion to polar surfaces. The present invention provides an adhesive composition with a vinyl aromatic hydrocarbon/diene/acrylic monomer block copolymer which provides better adhesion to Kraft paper while retaining the advantageous properties of SIS block copolymers in adhesives: high shear, aggressive tack, high peel, adhesion to non-polar surfaces, etc.

SUMMARY OF THE INVENTION

The present invention is an adhesive composition which comprises a tackifying resin, a styrene-isoprene-styrene (SIS) block copolymer of the type commonly used in adhesives and a block copolymer of a conjugated diolefin which contains both a vinyl aromatic hydrocarbon and an acrylic monomer as part of the polymer backbone. The acrylic monomer copolymer used in the composition of the present invention is comprised of at least one vinyl aromatic hydrocarbon block and at least one conjugated diolefin block and at least one acrylic monomer block which is on the end of the copolymer and attached to a conjugated diolefin block and has the structure

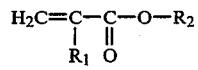

$R_1$ is hydrogen, phenyl or an alkyl radical which is linear or branched and has from 1 to 10 carbon atoms and $R_2$ is an alkyl radical which has from 1 to 14 carbon atoms, may contain a tertiary amine or an ether linkage and may be a cyclic hydrocarbon. The acrylic monomer block copolymer preferably comprises from 5 to 80% by weight of the total amount of block copolymers in the adhesive composition.

These polymers are functionalized in that they contain, in the polymer backbone, acrylic, especially methacrylate, functionality. This provides the polymer with strongly reactive and interactive chemical groups. In the formula above, it is preferred that $R_2$ be branched at the first carbon because branching makes the monomer easier to polymerize. An example is t-butyl which has the formula:

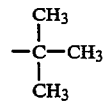

It is preferred that the acrylic monomers be alkyl methacrylates and the preferred alkyl methacrylate is tertiary butyl methacrylate because it is the most useful methacrylate for anionic polymerization. Further, it is preferred that the tackifying resin comprise from about 20 to about 400 parts by weight per 100 parts rubber (phr). The preferred structure for use in this invention is a linear styrene-isoprene-tertiary butyl methacrylate block copolymer.

DETAILED DESCRIPTION OF THE INVENTION

The styrene-isoprene-styrene (SIS) block copolymers used herein are well known in the industry as is their method of manufacture (see U.S. Pat. Nos. 3,468,972 and 3,595,941, which are herein incorporated by reference). They have been used in adhesive formulations for many years (see U.S. Pat. Nos. 3,239,478 and 3,935,338, which are herein incorporated by reference). The molecular weights (determined as described below) of these polymers may range from 40,000 to 300,000, preferably 100,000 to 200,000. These polymers may be hydrogenated or unhydrogenated.

The vinyl aromatic hydrocarbon/diene/acrylic monomer copolymer with the acrylic monomer block on one end should comprise from 5 to 80% by weight of the total amount of block copolymers in the adhesive composition because it is unlikely that less than 5% will have any desired effect and greater than 80% polymer is probably not economically necessary or desirable. The preferred range is 10 to 65%.

It is important to note that the three block acrylic monomer-containing polymer of the present invention is difficult to make and maintain as 100% three block copolymer. The S-I-M (when styrene and isoprene are the vinyl aromatic hydrocarbon and the diene, respectively, and the acrylic monomer block is represented as M) polymer has a strong tendency to couple through the M blocks and form a five block polymer, S-I-M-I-S.

This five block polymer is not thought to be as effective in promoting adhesion to polar surfaces as the three block polymer because the M block in a 5 block polymer is more spacially constrained and less likely to promote bonding than the M block in a 3 block polymer. An acrylic monomer block must be at the end of the polymer and it must be attached to a conjugated diene block in order to have freedom to migrate and bond to the polar surface. The diene block possesses a low glass transition temperature and is flexible. Attachment to the glassy styrene block would be very constraining. The so-called "blend" of these two polymers may contain up to and even over 50% by weight of the five block copolymer. It is advantageous to try to minimize the amount of five block copolymer in order to achieve the greatest freedom of movement and adhesion to the polar surface. However, it is possible to use the five block coupled polymer to replace the SIS block copolymer in an adhesive formulation and achieve the advantages of this invention. The amount of the "blend" which is used must be chosen so that the amount of the desired three block copolymer present is from 5 to 80% by weight as described above.

The new polymers which may be used according to the present invention are block polymers of vinyl aromatic hydrocarbons, conjugated dienes and acrylic monomers of the formula described above such as alkyl methacrylates or derivatives of alkyl methacrylates such as hydrolyzed alkyl methacrylates or anhydride derivatives thereof. Other suitable acrylic monomers include acrylates, such as t-butyl acrylate; cyclic alkyl methacrylates, such as 2,5-dimethylcyclohexyl methacrylate; and acrylates in which the alkyl group contains an ether linkage, such as tetrahydrofuran acrylate. Copolymers containing two or more conjugated dienes could be useful herein. The description which follows is described in terms of block copolymers of conjugated dienes, alkyl methacrylates and vinyl aromatic hydrocarbons but it is applicable also to the other acrylic monomers described in this paragraph.

The present invention encompasses polymers which are both high and low in molecular weight, as well as in between. High molecular weight polymers include those up to several million molecular weight as defined by gel permeation chromatography (GPC) peak molecular weight of the main species. Low molecular weight polymers include those of only 1000 molecular weight or even less. In all cases these polymers contain blocks of vinyl aromatic hydrocarbons, conjugated dienes and acrylic monomers (alkyl methacrylates).

The molecular weights of these polymers may range from 1,000 to 1,000,000, preferably from 40,000 to 200,000. The vinyl aromatic hydrocarbon block molecular weight generally ranges from 4,000 to 30,000 and the conjugated diolefin block molecular weight generally ranges from 20,000 to 175,000. The molecular weight of the acrylic monomer block should be in the range from 100 to 30,000 because 100 represents the molecular weight of one unit and molecular weights greater than 30,000 can form a glassy, separate phase apart from the rubber, and not be able to bond to a polar surface.

Such block copolymers may be multiblock copolymers of varying structures containing various ratios of the monomers including those containing up to about 60% by weight of vinyl aromatic hydrocarbon. At higher vinyl aromatic hydrocarbon contents, the polymers are not elastomeric and have limited utility in adhesives, sealants and coatings.

It may be desirable to functionalize these block copolymers of methacrylate and rubber. However, the routes to acid functionalizing involve exposing the polymer to: (1) heat which eliminates isobutylene and water to form a methacrylic anhydride which then forms methacrylic acid upon exposure to water, or (2), hydrolysis of the ester group by heating (70°-90° C.) a polymer solution in the presence of an acid or acid catalyst. Both routes can degrade and/or crosslink unsaturated rubber. To circumvent this problem it is advantageous for the rubber block to be hydrogenated. An alternate route to acid functionalization of styrene-rubber copolymers is possible by sequentially polymerizing a segment of polymethacrylate onto one end of the styrene-rubber to make an "ABC" type polymer. The acid functionality can then be made in situ during the acid wash stage of catalyst removal.

The block copolymers may be produced by any well known block polymerization or copolymerization procedures including the well-known sequential addition of monomer techniques, incremental addition of monomer technique or coupling technique. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. The manufacture of such polymers containing alkyl methacrylates is described in U.S. Pat. Nos. 5,002,676 and 5,194,510, both of which are herein incorporated by reference.

Conjugated dienes which may be utilized to prepare the polymers and copolymers include those having from 4 to 8 carbon atoms and also include 1,3-butadiene, 2-methyl-1,3-butadiene(isoprene), 2,3-dimethyl-1,3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tert-butylstyrene, 2,4-dimethylstyrene, alpha-methylstyrene, vinylnapthalene, vinylanthracene and the like. The preferred vinyl aromatic hydrocarbon is styrene.

The preferred polymers for use herein are block copolymers which contain a block of vinyl aromatic hydrocarbon and a block of conjugated diene and a block of alkyl methacrylate because these polymers combine the strength and elasticity of styrenic block copolymers with a polymeric block incorporating functionality which can provide enhanced adhesion to polar surfaces. Alkyl methacrylates are preferred for use herein and those employed herein include methacrylates wherein the alkyl group has up to 14 carbon atoms inclusive. Derivatives of these polymers are also included herein, such as, for example, polymers with partially or completely acidified methacrylate groups, their anhydrides, their ionomers, their reaction products with alcohols and amines, and the like. Derivatives of alkyl methacrylates include methacrylic acid, methacrylic acid salts (for example, zinc, sodium and quaternary ammonium salts) and anhydrides formed between adjacent acid units by heating. It should be noted that derivatization of the methacrylate group can be carried out prior to adding the polymer to the tackifying resin or in situ after the polymer is added to the tackifying resin. The in situ reaction requires a reactive ester group such as t-butyl or 1,1-dimethyl alkyl ester. Catalysts such as acids and bases can be added to aid the in situ conversion in adhesives. Illustrative of such methacrylate esters are methyl methacrylate, ethyl methacrylate, sec-butyl methacrylate, t-butyl methacrylate, i-amyl methacrylate, hexyl methacrylate, decyl methacrylate and dodecyl methacrylate. Largely because of ease of polymerization, the preferred alkyl methacrylates are branched-butyl methacrylates, i.e., isobutyl methacrylate and t-butyl methacrylate. The desired poly(alkyl methacrylate) block is produced by directly polymerizing the corresponding alkyl methacrylate monomer or alternatively the desired block is obtained by polymerizing a more easily polymerizable methacrylate and subsequently transesterifying the product to introduce the desired alkyl group. Tertiary butyl methacrylate (TBMA) is preferred because of ease of purification and polymerization.

The present invention works with both unhydrogenated, including the SIS, and hydrogenated, including the styrene-ethylene-propylene-styrene (SEPS), polymers. Hydrogenated ones are useful in certain circumstances. While unhydrogenated diene polymers have a number of outstanding technical advantages, one of their principal limitations lies in their sensitivity to oxidation. This can be minimized by hydrogenating the copolymers, especially in the diene blocks. The hydrogenation of these polymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used as described in U.S. Pat. No. 5,039,755, which is herein incorporated by reference. Suitable hydrogenation processes which can be used are ones wherein the dienecontaining polymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and Reissue 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation.

The acrylic monomer content of the polymer is generally no more than about 20% but acrylic monomer contents of up to 70% are possible. Generally, the acrylic monomer may be present in the polymer in an amount from about 1% to about 20% because lower amounts will not provide the advantages of the present invention and higher amounts are not advantageous from a cost standpoint. All percentages expressed above are weight percentages based on the total weight of the block copolymer.

It is essential to the performance of the present invention that the block copolymers used herein have sufficient acrylic monomer to provide sufficient polar-type functionality to provide enhanced adhesion to the polar surfaces, aluminum, glass, Kraft paper, etc., relative to block polymers of conjugated dienes and/or vinyl aromatic hydrocarbons which do not contain such acrylic monomers in the polymer backbone. It is theorized that the presence of sufficient amounts of acrylic monomer in the polymer backbone increases the adhesion to these surfaces by forming attractive dipolar interactions with the surface and/or hydrogen bonds with the surface.

It is usually necessary to add to the SIS (or SEPS) and acrylic monomer-containing polymers an adhesion promoting or tackifying resin that is compatible with the elastomeric diene blocks. A common tackifying resin is a diene-olefin copolymer of piperylene and 2-methyl-2-butene having a softening point of about 95° C. This resin is available commercially under the tradename Wingtack 95 and is prepared by the cationic polymerization of 60% piperylene, 10% isoprene, 5% cyclopentadiene, 15% 2-methyl-2-butene and about 10% dimer, as taught in U.S. Pat. No. 3,577,398 incorporated by reference. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C. and about 115° C. Hydrogenated resins may be used to advantage if there is a need to keep the level of unsaturation low.

Other adhesion promoting resins which are also useful in the compositions of this invention include hydrogenated rosins, esters of rosins, polyterpenes, terpene-phenol resins and polymerized mixed olefins. To obtain good thermo-oxidative and color stability, it is preferred that the tackifying resin be a saturated resin, e.g., a hydrogenated dicyclopentadiene resin such as Escorez ® 5000 series resin made by Exxon or a hydrogenated polystyrene or polyalphamethyl styrene resin such as Regalfez ® resin made by Hercules.

The amount of adhesion promoting resin employed varies from 20 to 400 parts by weight per hundred parts rubber (phr), preferably between 100 to 350 phr. The rubber referred to herein is the polymer used in the adhesive composition.

The selection of the particular tackifying agent is, in large part, dependent upon the specific block copolymer employed in the respective adhesive composition. In the manufacture of disposable articles such as diapers, sanitary napkins and bed pads, there is the additional consideration of having a substantially white or clear adhesive composition.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo ® 6056 oil made by Arco. The amounts of rubber compounding oil employed in the invention composition can vary from 0 to 100 phr, and preferably between 0 to 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Additional stabilizers known in the art may also be incorporated into the adhesive composition. These may be for protection during the life of the disposable article against, for example, oxygen, ozone and ultraviolet radiation. However, these additional stabilizers should be compatible with the essential stabilizers mentioned herein-above and their intended function as taught herein.

The adhesive compositions of the present invention are typically prepared by blending the components at an elevated temperature, preferably between 130° C. and 200° C., until a homogenous blend is obtained, usually less than three (3) hours. Various methods of blending are known to the art and any method that produces a homogenous blend is satisfactory.

The resultant adhesives may then preferably be used in a wide variety of applications. Examples include tapes, labels, diapers, sanitary napkins and decals. Tapes, labels and decals utilize a printable backing material, such as paper or plastic.

The adhesives of the present invention are useful as hot melt assembly adhesives and pressure sensitive adhesives, especially where adhesion to polar surfaces such as aluminum, glass, Kraft paper, etc. is desirable. Tape applications and label applications are examples of uses for pressure sensitive adhesives. Pressure sensitive adhesives are simply adhesives which can form a measurable bond to a surface at reasonable pressures, such as pressures normally expected by pressing one's finger on the adhesive backing. The adhesives of the present invention are also useful as hot-melt assembly adhesives which are adhesives which bond well to surfaces when hot, but which have little bonding capability at room temperature. Further, the compositions are useful in mastics which are solvent-based paste-like adhesives. These compositions should be useful in repulpable adhesives which are adhesives compatible with processes employed in recycling paper, principally because these polymers in the adhesive compositions should provide more water dispersibility due to the acrylic monomer functionality. The polymers are useful in contact adhesives which are coated on two surfaces, allowed to dry and pressed together to form a bond. They are useful in flexible packaging laminating adhesives.

Methacrylate-containing block copolymers may also be useful in adhesives by providing chemical functionality which can be utilized to accomplish crosslinking reactions between polymer chains. These crosslinking reactions are potentially useful in producing adhesives capable of performing at temperatures above 100° C. Conventional styrenic block copolymer-based adhesives are limited to applications at less than 100° C. due to the softening of styrenic domains. Crosslinking reactions can be accomplished with the methacrylic acid or methacrylic anhydride functional forms by using a melamine type crosslinking agent such as a Cymel ® resin. Other crosslinkers include diols, diamines and di-isocyanates.

A particular problem in crosslinking adhesives has been limited "pot life" stability. The polymers of the present invention offer a way to overcome this deficiency by utilizing the kinetics of the tertiary butyl methacrylate (ester) to methacrylic acid or anhydride transition to retard crosslinking until the system is coated. Crosslinkers such as those mentioned above will be inert with the methacrylate ester. Crosslinking of these polymers can give adhesives with enhanced holding power and performance at high temperatures.

Also, these compositions are useful in formulating sealants with improved adhesion to polar surfaces such as aluminum, glass, Kraft paper, etc., and may be used in hot melt form or applied through the use of a solvent. These polymers are also useful in general solvent-based coatings and graphic arts industries with applications in several systems (i.e. epoxies, urethanes and polyesters). They also are useful in specific novel applications including marine and maintenance coatings, coil coatings, automotive and automotive refinish coatings, packaging inks, overprint coatings, wood coatings, floor coatings, wall coatings and removable or strippable coatings. These coatings may include fillers, gloss improvers, pigments and stabilizers as ingredients in addition to the polymer. Suitable solvents for all of these solvent systems include the organics such as toluene, xylene, cyclohexane, etc.

In the following examples, the percent acrylic monomer was determined by nuclear magnetic resonance spectroscopy. The melt viscosity was measured in centipoise (cps) by using a Brookfield Thermocell viscometer at 350° F. The SAFT (M) Mylar was measured by 1"×1" Mylar to Mylar lap joint with a 1 kg weight. The SAFT (K) Kraft was measured by 1"×1" Mylar to Kraft paper lap joint with a 1 kg weight. SAFT measures the temperature at which the lap shear assembly fails under load. The molecular weights were determined by gel permeation chromatography as the peak molecular weight of the main species based on a polystyrene standard. The polystyrene content was determined by nuclear magnetic resonance spectroscopy. Rolling Ball (RB) Tack is the distance a steel ball rolls on the adhesive film with a standard initial velocity. Small numbers indicate aggressive tack. Holding Power is the time required to pull a standard area (½ in.×½ in.) of tape from a standard test surface, steel (S) or Kraft paper (K), under a standard load, in shear at 2° antipeel (Pressure Sensitive Tape Council Method No. 7). Peel was determined by PSTC Test No. 1. Polyken probe tack was determined by ASTM D-2979. Loop tack was determined using TLMI loop tack tester.

EXAMPLE 1

As described above, SIS block copolymers are commonly used in adhesive formulations in combination with SI block copolymers to increase tack. Thus, the present invention, which utilizes a blend of an SIS block copolymer with an SI-acrylic monomer block copolymer, is compared to a commonly used SIS/SI block copolymer blend. There is also a comparison to a blend of an SIS-acrylic monomer block copolymer, the preferred block copolymer of the above referenced U.S. Pat. No. 5,194,510, blended with an SI block copolymer.

The conventional block copolymer blend was an 80/20 weight percent blend of an SIS block copolymer having a molecular weight of 180,000 and a styrene content of 18% and an SI block copolymer having a molecular weight of 110,000 and a styrene content of 14%. The block copolymer blend of the present invention used an 80/20 blend of the same SIS block copolymer and a styrene-isoprene-acrylic monomer (SIM) block copolymer having a molecular weight of 115,000, a styrene content of 13%, and an acrylic monomer block molecular weight of 2,000. The acrylic monomer was tert-butyl methacrylate. The SI-acrylic monomer block copolymer contained 70% by weight of the three block copolymer and 30% of the coupled polymer as determined by gel permeation chromatography. Therefore, the desired three block copolymer comprised 14% of the total block copolymers in the blend. The comparative example utilizing the polymer of the patent utilized an 80/20 blend of an SISM block copolymer having a molecular weight of 225,000, a styrene content of 14%, and an acrylic monomer block molecular weight of 5,000. The acrylic monomer was the same. The SI diblock was the same diblock used above.

These three block copolymer blends were used in an adhesive formulation as described in the table below. The various adhesive properties of these formulations were determined and are listed below.

TABLE 1

Comparison of SIS/SIM Blends, SISM/SI Blends and SIS/SI Blends in Adhesive Formulations

| Formulation: | | |
|---|---|---|
| 40% | Polymer | |
| 48% | Piccotac ® 95, a C$_5$ based tackitying resin from Hercules | |
| 12% | Shellflex ® Oil | |

| | 80/20 Polymer tri-block/di-block blends M = 5,000 | | |
|---|---|---|---|
| | SIS/SI | SIS/SIM | SISM/SI |
| RBT (cm) | 1.0 | 1.6 | 6.9 |
| PPT (g) | 1600 | 1500 | 1200 |
| LT (pli) | 7.9 | 5.5 | 5.0 |
| 180° Peel (pli) | 5.1 | 4.5 | 7.6 |
| HPS (min) | 428 | 626 | 104 |
| HPK (min) | 61 | 144 | 85 |
| SAFT/M (°C.) | 85 | 86 | 78 |
| SAFT/K (°C.) | 68 | 77 | 65 |
| 180° Peel at 1 Day | 4.3(a) | 5.3(a) | 9.4(c) |

(a) = adhesive failure
(c) = cohesive failure

It can be seen that the holding power to Kraft of the formulation made with the block copolymer blend of the present invention has over two times the holding power to Kraft paper of the presently commonly used block copolymer blend and almost two times the holding power to Kraft of the blend utilizing the preferred polymer of the patent. Further, it can be seen that the shear adhesion failure temperature to Kraft paper for the formulation made with the present invention is significantly higher than that of either of the other two formulations.

EXAMPLE 2

In this example, four different adhesives were compared. They each were comprised of 80% of the same SIS block copolymer used in Example 1 and 20% of either the SI diblock described below in Table 2 or one of the three SIM triblocks described below in Table 2. The structures indicated for the various polymers are the true molecular weights of the different blocks, i.e., 11-138-5 means that the styrene block molecular weight was 11,000, the isoprene block molecular weight was 138,000 and the acrylic monomer (which was tert-butyl methacrylate as used in Example 1) block molecular weight was 5,000. The adhesive properties were determined and are shown in Table 2 below. The data for the 11-69-2 SIM polymer are the same as those shown in Comparative Example #1.

TABLE 2

Comparison of the Adhesive Properties of S-I-M With S-I in a Tri-block Blend

| Formulation: | |
|---|---|
| 40% | Polymer (80% triblock/20% S-I or S-I-M) |
| 48% | Piccotac ® 95 |
| 12% | Shellflex ® 371 Oil |

| | S-I-M Structure | | |
|---|---|---|---|
| 11-69 (S-I) | 11-138-5 | 11-138-15 | 11-69-2 |

TABLE 2-continued

Comparison of the Adhesive Properties of S-I-M With S-I in a Tri-block Blend

| RBT (cm) | 1.0 | 1.6 | 4.7 | 1.6 |
|---|---|---|---|---|
| PPT (g) | 1600 | 900 | 1200 | 1500 |
| LT (pli) | 7.9 | 6.6 | 6.2 | 5.5 |
| 180° Peel (pli) | 5.1 | 4.7 | 4.5 | 4.5 |
| SAFT/M (°C.) | 85 | 87 | 86 | 86 |
| SAFT/K (°C.) | 68 | 73 | 74 | 77 |
| HPS (min) | 428 | 238 | 419 | 626 |
| HPK (min) | 61 | 199 | 247 | 144 |
| 180° Peel at 1 Day | 4.3(a) | 4.1(a) | 4.8(a) | 5.3(a) |

(a) = adhesive failure

It can be seen that the holding power to Kraft of all three of the SIM-containing adhesives are much higher than the holding power to Kraft of the SI-containing adhesive. Similarly, the SAFT to Kraft of all three of the SIM structures are higher than that of the SI structure.

EXAMPLE 3

In this example, the relative amounts of the SIS block copolymer and the SIM block copolymer were varied from 80/20 to 60/40. The amounts of the three block polymer present were 14%, 21%, and 28%. The SIM block copolymer used was the polymer used in Example 1, and also the third polymer used in Example 2. The adhesive property results are shown below in Table 3. The last column is merely a repeat of the first column of Table 2 to enable a direct comparison with the adhesive properties wherein the SI diblock was used.

TABLE 3

Effect of S-I-S/S-I-M Blend on Adhesive Properties

| Formulation: | |
|---|---|
| 40% | Polymer |
| 48% | Piccotac ® 95 |
| 12% | Shellflex ® 371 |
| S-I-M = 11-69-2 | |

| | Tri-Block/Di-Block Blends | | | |
|---|---|---|---|---|
| | 80/20 | 70/30 | 60/40 | 80/20 11-69 (S-I) |
| RBT (cm) | 1.6 | 1.9 | 7.8 | 1.0 |
| PPT (g) | 1500 | 1390 | 1240 | 1600 |
| LT (pli) | 5.5 | 5.0 | 5.4 | 7.9 |
| 180° Peel (pli) | 4.5(a) | 5.2(a) | 5.6(a) | 5.1(a) |
| SAFT/M (°C.) | 86 | 86 | 86 | 85 |
| SAFT/K (°C.) | 77 | 74 | 69 | 68 |
| HPS (min) | 626 | 445 | 1317 | 428 |
| HPK (min) | 144 | 236 | 267 | 61 |
| 180° Peel at 1 Day | 5.3(a) | 5.6(a) | 5.4(a) | 4.3(a) |

(a) = adhesive failure

All three of the blends containing the SIM block copolymer had significantly higher holding power to Kraft than the diblock adhesive formulation. The SAFT to Kraft is also higher. Among the three different blends made according the present invention, it appears that the holding power to Kraft increased as the amount of SIM block copolymer used was increased. Also, the SAFT to Kraft decreased.

EXAMPLE 1

This example provides a comparison between a polymer within the scope of the present invention and a commercially available polymer used for adhesive applications. The polymer made according the present invention, Polymer A, is a blend of a coupled five block polymer S-I-M-I-S and three block polymer S-I-M wherein the three block polymer comprises 65 percent by weight of the blend. In this case the tert-butyl methacrylate functionality was thermally converted to methacrylic anhydride by heating the polymer at 220° C. for 45 minutes under vacuum. The commercial polymer is KRATON® D1113 polymer which contains 55 percent of a styrene-isoprene diblock and 45 percent of a styrene-isoprene-styrene triblock. The block molecular weights of the styrene and isoprene blocks in the two polymers are relatively close.

Polymer A was incorporated into an adhesive formulation at 100 parts per hundred by weight of the polymer, 133 parts per hundred by weight of Escorez® 1310 tackifying resin and 18 parts by weight of Shellflex® oil. The results obtained with this adhesive formulation is contrasted in the following table with the predicted results for the KRATON® D1113 polymer in a similar formulation. The formulation contains 100 parts per hundred by weight of the polymer, 133 parts by weight of Piccotac® 95 tackifying resin (which is very similar to the Escorez® 1310 tackifying resin), and 18 parts by weight of Drakeol 34 oil (which is very similar to the Shellflex® oil).

TABLE 4

| Comparison of S-I-S/S-I-M Blend With KRATON ® D1113 Polymer | | |
|---|---|---|
| | Polymer A | D1113 |
| Rolling Ball Tack, cm | 1.0 | 1.6 |
| Polyken Probe Tack, kg | 1.52 | 1.39 |
| Loop Tack, pli | 6.8 | 7.5 |
| 180° Peel, pli | 6.2[a] | 10.9 |
| SAFT to Mylar, °C. | 78[c] | 79 |
| SAFT to Kraft, °C. | 67[a] | 65 |
| Holding Power to Steel, min | 924 | 178 |
| Holding Power to Kraft, min | 87 | 1 |

[a] Adhesive failure
[c] Cohesive failure

It is seen for Polymer A that SAFT to Kraft is higher than that measured for D1113, and that the holding powers to steel and Kraft are significantly better than those for D1113.

I claim:

1. An adhesive composition a) comprising a tackifying resin, b) a styrene-isoprene block copolymer with styrene blocks as the end blocks and having at least one internal block of an acrylic monomer, and c) a block copolymer of at least one vinyl aromatic hydrocarbon, at least one conjugated diolefin and at least one acrylic monomer which is on the end of the copolymer and is attached to a conjugated diene block and has the structure

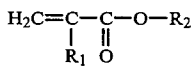

wherein $R_1$ is selected from the group consisting of hydrogen, phenyl and alkyl radicals which are linear or branched and contain from 1 to 10 carbon atoms, and $R_2$ is H or a cyclic or non-cyclic alkyl radical which contains from 1 to 14 carbon atoms and may contain a tertiary amine or an ether linkage.

2. The composition of claim 1 wherein the acrylic monomer in both the polymers of b) and c) is an alkyl methacrylate.

3. The composition of claim 2 wherein the alkyl methacrylate is tertiary butyl methacrylate.

4. The composition of claim 1 wherein the tackifying resin comprises from about 20 parts to about 400 parts by weight per 100 parts rubber.

5. The composition of claim 1 wherein the acrylic monomer blocks of b) and c) are selected from the group consisting of polyacrylic acids, esters of polyacrylic acids and mixtures thereof.

6. The composition of claim 1 wherein the acrylic monomer block copolymer is a three block copolymer and comprises from 5 to 80% by weight of the total amount of block copolymers in the composition.

7. The composition of claim 1 wherein the polymer is a linear A-B-acrylic monomer block copolymer wherein A is a vinyl aromatic hydrocarbon and B is a conjugated diene.

8. The composition of claim 7 wherein A is styrene and B is isoprene.

9. The composition of claim 8 wherein the acrylic monomer in both the polymer of b) and c) is an alkyl methacrylate.

10. The composition of claim 9 wherein the alkyl methacrylate is tertiary butyl methacrylate.

11. A pressure sensitive adhesive made with the composition of claim 1.

12. A tape comprising the composition of claim 11 and a backing material.

13. A label comprising the composition of claim 11 and a backing material.

14. An assembly adhesive composition comprising the composition of claim 1.

15. A mastic comprising the composition of claim 1 and a solvent.

16. A sealant composition comprising the composition of claim 1 and a solvent.

17. A coating composition comprising the composition of claim 6 and a solvent.

18. A high temperature pressure sensitive adhesive made with the composition of claim 1 and a suitable crosslinking agent.

* * * * *